J. SHEPARD.
Plant Protector.
No. 81,693.
Patented Sept. 1, 1868.
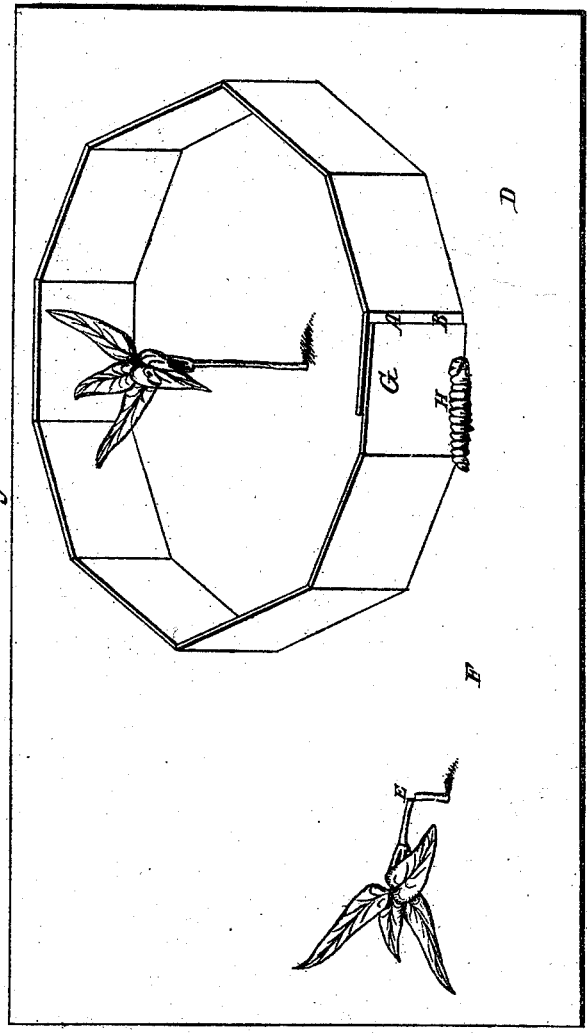
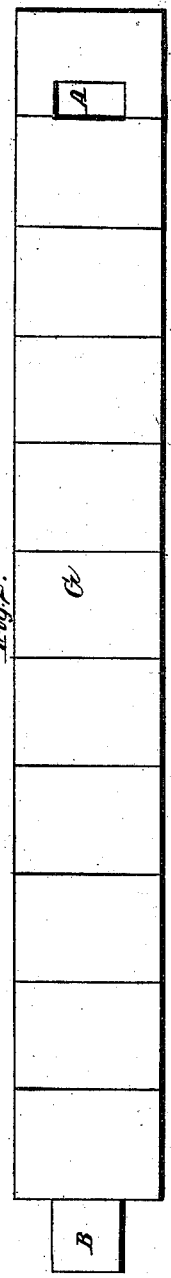

United States Patent Office.

JAMES SHEPARD, OF BRISTOL, CONNECTICUT.

Letters Patent No. 81,693, dated September 1, 1868.

IMPROVEMENT IN PROTECTING PLANTS, &c.

*The Schedule referred to in these Letters Patent and making part of the same.*

TO ALL WHOM IT MAY CONCERN:

Be it known that I, JAMES SHEPARD, of Bristol, in the county of Hartford, State of Connecticut, have invented a new and improved Plant-Protector for protecting young and tender plants from the devastations of the larvæ of the genus *Agrotis*; and I do hereby declare that the following is a full, clear, and exact description thereof, which will enable others skilled in the art to make and use the same, reference being had to the accompanying drawings, making a part of this specification, in which—

Figure 1 is a perspective view of my invention and a portion of a garden.

Figure 2 is a view of my invention ready for transportation.

Similar letters of reference indicate like parts.

My invention consists in the use or employment of a single strip of thin wood or a veneer, for enclosing or fencing a plant.

It is creased or scored across it in several places, which places are designated by perpendicular lines. The object of scoring it is to make it form, with little or no tendency to straighten, while the short bends at the scorings entirely prevent it from warping.

At each scoring, it is bent until the ends lap, and a ring, G, is formed, which ring is placed over the plant C, with the plant C near its centre. Then press the veneer ring G into the ground D, about one-half its depth, which ground will secure it in its place, as shown in fig. 1.

E designates a pepper-plant that the larva has cut, and F is its trail or path towards the plant C.

H designates the larva as it has reached the veneer ring or protector G, which ring turns it from its course, and the plant C remains uninjured.

Although the larvæ of the genus *Agrotis*, (commonly known as the cut-worm,) burrow at the roots of a plant when they have cut it down, they never move from point to point under the surface of the ground.

They remain in the ground during the day, but when night comes on, they come to the surface, and crawl about seeking what they can devour. Any small object in their path will turn them from their course; consequently, when they meet the protector G, they simply crawl around it, and the enclosed plant remains untouched.

These facts have long been known to scientific men, and individuals have made for their own use metallic rings and square boxes of wood, and been well repaid for their trouble.

Nothing of the kind was ever manufactured to sell, as the metallic rings or boxes nailed together are so expensive that they cannot be brought into general use.

By my invention, the use or employment of a single strip of thin wood, or a veneer, these protectors can be made and sold, at a good profit, for one dollar and a half per thousand, which is so low that no one need to be without them, and much less than the time would cost to make home-made ones.

Tobacco-growers, gardeners, and those who buy expensive plants from green-houses, would never think of leaving their plants without these protectors, as, in some localities, many dollars' worth of plants are often cut down in a single night.

I do not claim a metallic ring for this purpose, neither do I claim a protector, made of two or more pieces of wood; but What I do claim, and desire to secure by Letters Patent, is—

As a new article of manufacture, a plant-protector, when constructed and arranged specially as and for the purpose described.

JAMES SHEPARD.

Witnesses:
 FRANK HUBBARD,
 JOHN A. WAY.